United States Patent [19]
Johnson et al.

[11] Patent Number: 5,918,901
[45] Date of Patent: Jul. 6, 1999

[54] AIRBAG MODULE WITH PRESSURE RELIEF ADAPTIVE PERFORMANCE

[75] Inventors: Darrin L. Johnson, Fountain Hills, Ariz.; Bradley D. Harris, Farmington; Donald R. Lauritzen, Hyrum, both of Utah

[73] Assignee: Autoliv ASP, Inc., Ogden, Utah

[21] Appl. No.: 08/802,803

[22] Filed: Feb. 18, 1997

[51] Int. Cl.⁶ .................................................. B60R 21/30
[52] U.S. Cl. ........................................... 280/739; 280/738
[58] Field of Search .................................... 280/739, 738, 280/731, 732

[56] References Cited

U.S. PATENT DOCUMENTS

| | | | |
|---|---|---|---|
| 4,964,652 | 10/1990 | Karlow | 280/739 |
| 5,388,860 | 2/1995 | Brede et al. | 280/739 |
| 5,524,925 | 6/1996 | Rose et al. | 280/739 |
| 5,564,738 | 10/1996 | Johnson | 280/736 |
| 5,566,975 | 10/1996 | Stull et al. | 280/732 |
| 5,573,269 | 11/1996 | Gentry et al. | 280/735 |
| 5,645,297 | 7/1997 | Rose et al. | 280/739 |
| 5,664,802 | 9/1997 | Harris et al. | 280/736 |

*Primary Examiner*—Kenneth R. Rice
*Attorney, Agent, or Firm*—Sally J. Brown

[57] ABSTRACT

An airbag module providing adaptive performance. The module includes a housing defining an interior. At least an inflator is received within the housing, and preferably the folded, uninflated cushion, also. Various arrangements are provided to selectively block, or create, a vent extending through the housing. This vent, when open, permits the inflation gas provided by the inflator to exit the housing without entering the cushion. The vent may be initially open, and blocked by a sliding cover block, may be initially closed and opened by movement of a slide plug, or may be initially closed and opened by deformation of a portion of the housing. The venting of the inflation gas will at least slow the rate of inflation of the cushion, and may reduce the final pressure within the cushion. As such, the housing will be vented for less severe collisions, and will not be vented for more severe collisions.

12 Claims, 3 Drawing Sheets

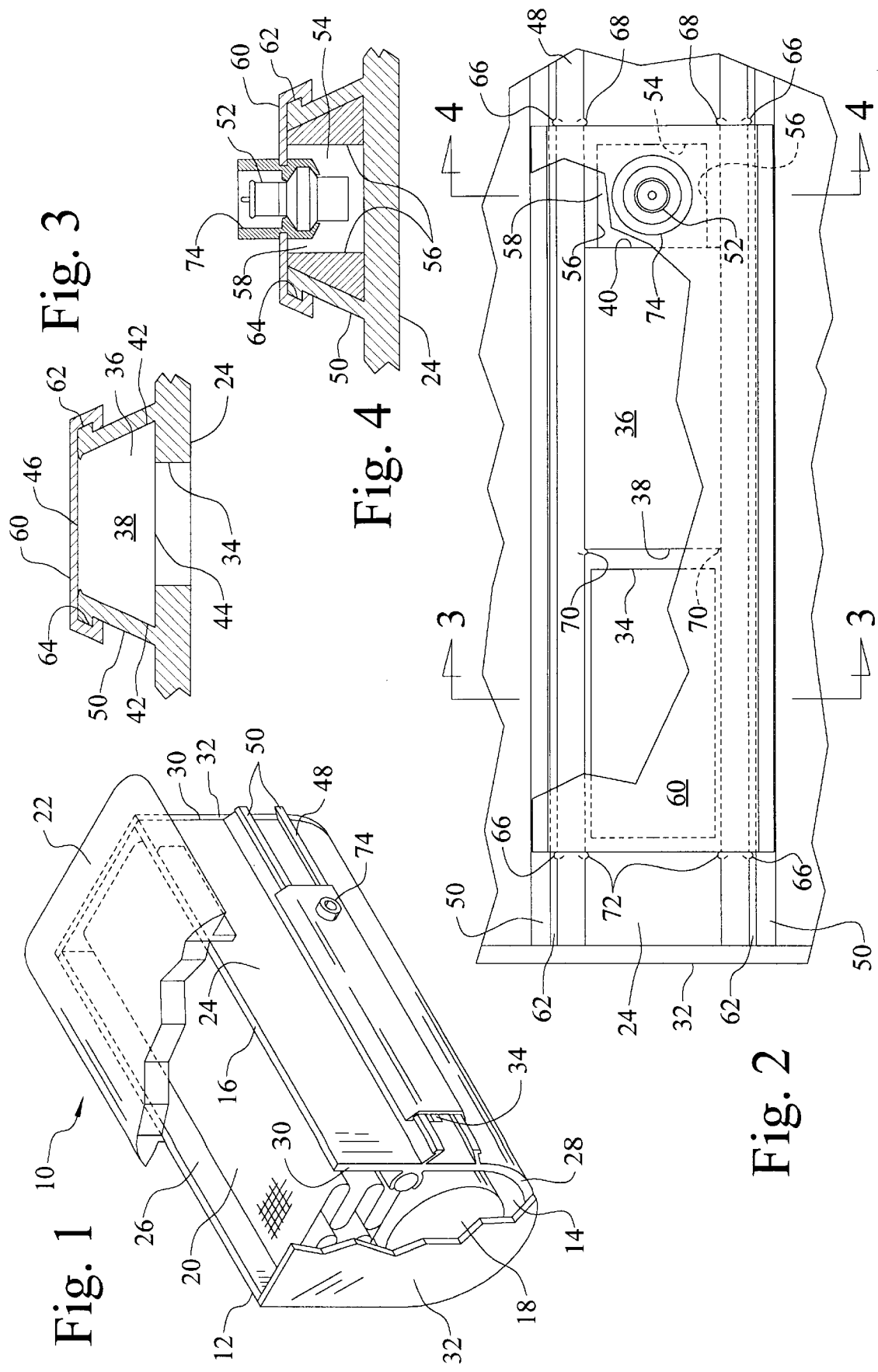

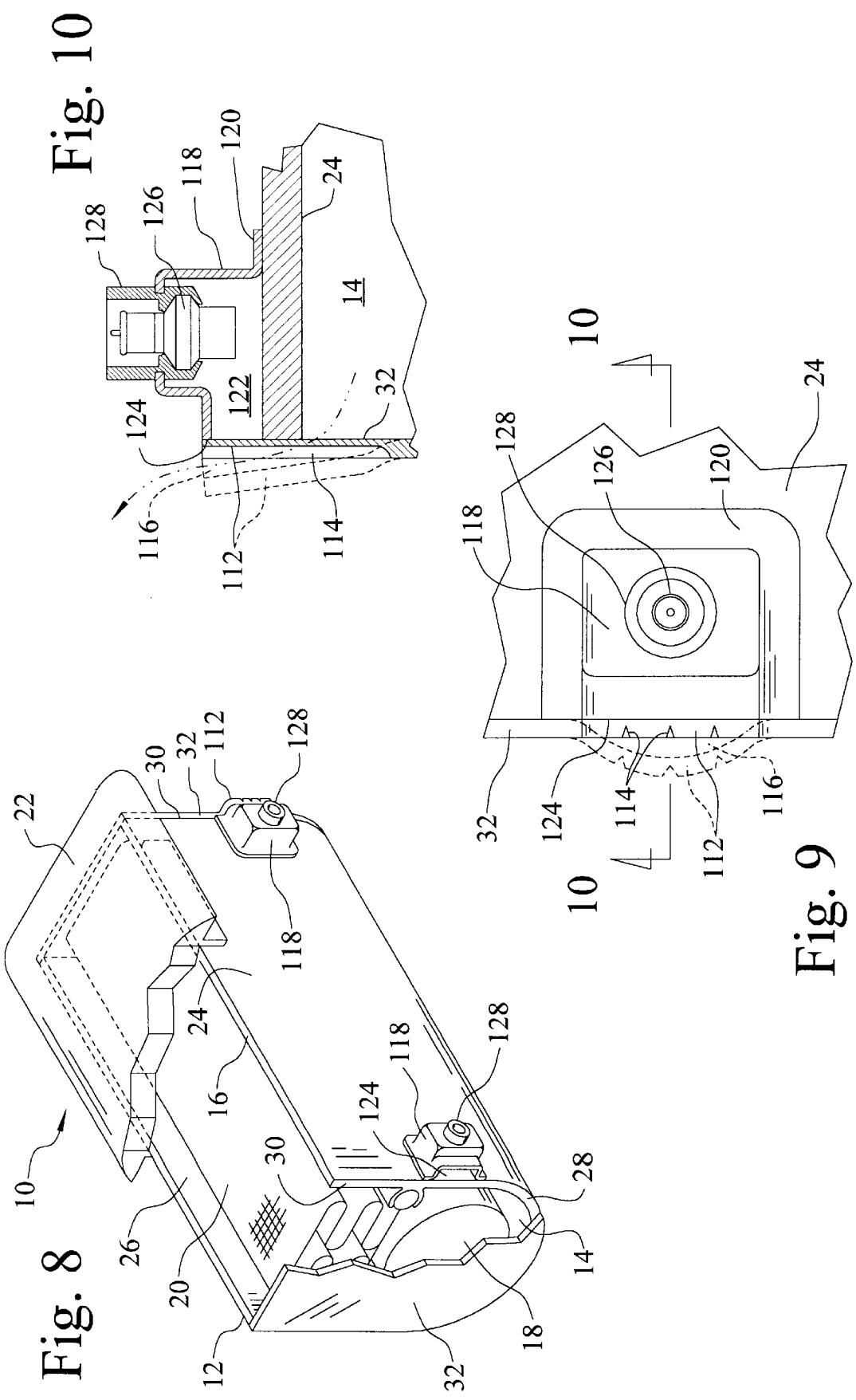

AIRBAG MODULE WITH PRESSURE RELIEF ADAPTIVE PERFORMANCE

CROSS-REFERENCE TO RELATED INVENTIONS

This application is related to U.S. Ser. No., 08/802,457 filed Sep. 15, 1998, U.S. Pat. No. 5,806,884, to the same inventors, currently pending.

BACKGROUND OF THE INVENTION

1. Field of the Invention

The present invention relates in general to airbag passive restraint systems. In particular, the present invention relates to an improved arrangement for providing adaptive performance in airbag systems by selective venting of inflation gas from the housing of the system.

2. Description of the Related Art

Airbag passive restraint systems have become increasingly common in vehicles to protect the vehicle occupants during a collision. Such systems typically include a collision sensor to determine when a collision occurs, an inflator to provide a quantity of inflation gas upon receipt of a signal from the collision sensor, and a flexible cushion inflated by the inflation gas. The occupant of the vehicle impacts against this cushion to lessen the forces of the collision and reduce or eliminate injury.

One common arrangement for such a system is to provide an inflator received within the interior of a housing. The housing will include a opening or mouth providing access to the interior. The folded, uninflated cushion will also be received within the housing, with the mouth of the cushion secured to the housing such that the inflation gas may readily flow into the cushion. One or more covers will initially block the opening to the housing to protect the cushion and inflator. The cover(s) will open to permit the inflating cushion to exit the housing. These components taken together are typically referred to as a module, and are commonly employed for protection on the passenger side of the vehicle.

While this basic arrangement is serviceable, there has been a desire to provide airbag systems with adaptive performance. Adaptive performance is a variation in the module performance to provide the best protection to the occupant based upon the specific facts of the actual collision. For example, collisions vary in their severity, occupants vary in their weight, the position of the occupant in the seat (and therefore the distance from the inflating cushion) varies, the ambient temperature can affect gas output, etc. In adaptive performance a controller measures some or all of these variables (or others) and causes the module to inflate the cushion in a manner best suited to provide protection. For example, if the occupant is seated well forward in the seat, and is therefore close to the inflating cushion, the cushion may be inflated at a slower rate, so that the cushion does not injure the occupant during its inflation.

SUMMARY OF THE INVENTION

An object of the present invention is to provide an airbag module which safely and reliably provides an inflated protective cushion.

Another object of the present invention is to provide an airbag module which has adaptive performance.

Another object of the present invention is to provide an airbag module having an inflator received within a housing, and to selectively vent inflation gas from the housing to thus selectively vary the performance of the module.

Yet another object of the present invention is to provide such a module in which a portion of the housing is moved to block, or uncover, a vent in the housing.

These and other objects are achieved by an airbag module providing adaptive performance. The module includes a housing defining an interior. At least an inflator is received within the housing, and preferably the folded, uninflated cushion, also. Various arrangements are provided to selectively block, or create, a vent extending through the housing. This vent, when open, permits the inflation gas provided by the inflator to exit the housing without entering the cushion. The vent may be initially open, and blocked by a sliding cover block, may be initially closed and opened by movement of a slide plug, or may be initially closed and opened by deformation of a portion of the housing. The venting of the inflation gas will at least slow the rate of inflation of the cushion, and may reduce the final pressure within the cushion. As such, the housing will be vented for less severe collisions, and will not be vented for more severe collisions.

BRIEF DESCRIPTION OF THE DRAWINGS

The objects and features of the invention noted above are explained in more detail with reference to the drawings, in which like reference numerals denote like elements, and in which:

FIG. 1 is a perspective view with partial cut-away of a module according to a first embodiment of the present invention;

FIG. 2 is a detail side view, with partial cut-away, of the venting arrangement of FIG. 1;

FIG. 3 is a cross-sectional view along line 3—3 of FIG. 2;

FIG. 4 is a cross-sectional view along line 4—4 of FIG. 2;

FIG. 8 is a perspective view with partial cut-away of a module according to a third embodiment of the present invention;

FIG. 9 is a detail side view of the venting arrangement of FIG. 8; and

FIG. 10 is a cross-sectional view along line 10—10 of FIG. 9.

DETAILED DESCRIPTION OF THE INVENTION

Figure 6:
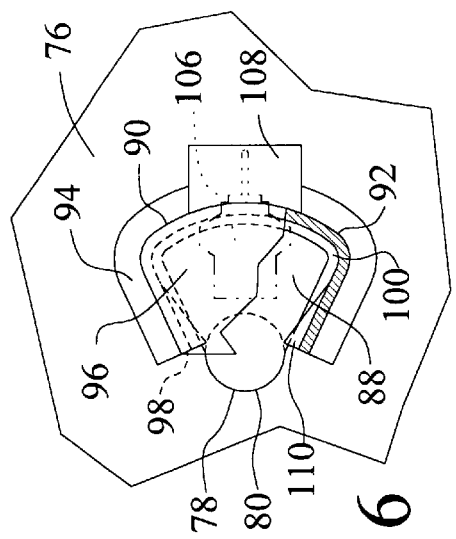
FIG. 6 is an end view with partial cut-away of the arrangement of FIG. 5.

With reference to FIG. 1, an airbag module according the present invention is generally designated by reference numeral 10. The airbag module 10 generally includes: a housing 12 having a generally concave shape and defining an interior 14 and a housing mouth 16 providing access to the interior; an inflator 18 received within the interior 14; a cushion 20 also received within the interior 14 in its folded, uninflated state; and a cover 22 mounted to the housing to initially close the housing mouth 16. Each of these elements will be discussed in more detail.

The housing 12 includes first and second spaced, opposed side walls 24 and 26 joined at an inner end by a bottom wall 28. In the embodiment shown, the walls 24, 26 and 28 are formed as a monolithic unit, preferably by extrusion, and the bottom wall 28 is curved to provide a U-shaped cross-section. The side walls 24 and 26 (and bottom wall 28) have longitudinal ends 30. The housing further includes an end wall 32 located at each of the longitudinal ends 30. Each end wall 32 is secured in position, such as by screws (not shown) or other fastening arrangements known in the art. The first side wall 24, second side wall 26, bottom wall 28 and end walls 32 serve to define the interior 14. The side walls 24 and 26, and end walls 32, all have an upper edge which together define the housing mouth 16.

The inflator 18 may be of any type which will produce a sufficient quantity of inflation gas within the desired short time period. Pyrotechnic inflators are commonly employed, but inflators operating on different principles may be used. The inflator 18 is secured within the housing 12 by any appropriate arrangement, such as by bolts (not shown) extending from the inflator 18 and extending through the end walls 32. The cushion 20 will be formed of a flexible material such as fabric, and will include a cushion mouth secured to the housing in any manner known in the art. The mounting of the cushion mouth will maintain the cushion mouth in an open state to receive the inflation gas from the inflator 18 to inflate the cushion 20. The cushion 20 may have any desired shape or form in its inflated condition. The cover 22 will also be secured to the housing 12, again by any arrangement known in the art. The cover 22 serves to protect the cushion 20 during its storage in the housing 12, and may provide a decorative appearance for the module. The airbag module 10 is typically mounted such that the cover 22 forms a portion of the vehicle interior, for example a portion of the dashboard. The cover 22 will include some arrangement, such as lines of reduced strength, to permit the inflating cushion 20 to rupture the cover 22 to extend into the vehicle interior to protect the occupant.

In operation, the inflator 18 will receive a signal from a controller (not shown) upon the onset of a collision. The inflator 18 will produce a quantity of inflation gas very rapidly. The inflation gas will flow into the cushion 20, causing it to expand from its folded condition as it inflates. The force of the inflating cushion 20 will rupture the cover 22, and the cushion 20 will expand through the housing mouth 16 and cover 22 into the interior of the vehicle, in operative position to protect the occupant. The occupant will compress the inflated cushion, which rapidly expels the inflation gas to provide a soft surface preventing injury.

The above description is typical of prior art airbag modules. The present invention, however, is concerned with providing adaptive performance in a module of this general type. As noted above, adaptive performance is the variation in the performance of the airbag system to provide the best protection based upon the actual events of a collision. For example, collisions vary in their severity, occupants vary in their weight and distance from the inflating cushion, the ambient temperature affects the amount of gas produced by most inflators, etc. Adaptive performance requires discriminating between one or more of these conditions (or others) and varying the performance of the module in response thereto. The most common variations in inflator performance are the rate of inflation of the cushion, and the total amount of inflation of the cushion.

The rate of inflation refers to the time taken to completely inflate the cushion. At their most extreme, airbag modules can inflate at such a rapid rate that the cushion is violently pushed into the occupant, causing injury. As such, in adaptive performance the rate of inflation may be reduced if the occupant is sitting close to the module, if the collision is less severe, etc. Conversely, if the collision is very severe, it may be necessary to inflate the cushion at the maximum rate to ensure inflation before the occupant begins to compress the cushion.

The total amount of inflation determines how "hard" or "soft" the cushion is. If the collision is severe, or if the occupant has a large weight, the cushion may need to be inflated to the maximum "hardness". However, for less severe collisions, or smaller occupants, a "softer" cushion may provide complete protection without risk of the cushion itself impacting the occupant.

To provide adaptive performance in an airbag module, the present invention consists of means to permit selective pressure relief from the housing to vent a portion of the inflation gas. Since a portion of the inflation gas is vented from the housing, it does not enter the cushion. This will permit selective variation in the inflation rate of the cushion, and may also permit selective amounts of inflation. Various arrangements are available to provide this selective pressure relief, with three examples described in detail below.

A first embodiment of an airbag module having pressure relief is illustrated in FIGS. 1–4. As is best shown in FIG. 2, the means to permit selective pressure relief from the housing includes a housing vent 34 extending through the housing 12 to permit the interior 14 to communicate with atmosphere. In particular, the housing vent 34 is shown extending through the first side wall 24, although it could extend through the second side wall 26 or bottom wall 28. The housing vent 34 may be initially sealed with a foil or film (not shown) to prevent ingress of foreign materials or moisture. Further, while a single large vent is shown, two or more smaller vents could also be employed.

The means to permit selective pressure relief from the housing also includes a slide member in the form of a slide block 36 movable between a first position, shown in FIG. 2, and a second position in covering relation to the housing vent 34. In this first embodiment the movement is in the longitudinal direction, along the plane of the associated wall (in this case the first side wall 24). The slide block 36 may take various forms, but preferably has the general form of a rectangular prism, with a leading face 38, a trailing face 40, edge walls 42 extending between the faces 38 and 40, an inner face 44 and an outer face 46. The inner face 44 will be in abutting relation to the associated wall, as best shown in FIG. 3. The slide block 36 is formed of a material, such as aluminum, which is sufficiently rugged to withstand the pressure of the expanding gas when in the second position.

To permit this movement of the slide block 36, the means to permit selective pressure relief from the housing further includes guide means 40. The guide means 40 will permit the desired movement of slide block 36 from the first to the second position, but will prevent movement in other directions. In particular, the guide means 40 will prevent movement along the plane of the associated wall except in the longitudinal direction, and will prevent movement away from the plane of the associated wall. The associated wall will, of course, prevent movement of the slide block 36 into the plane of the wall.

The guide means will, in whole or in part, preferably take the form of a pair of slide rails 50. The slide rails 50 preferably take the form of monolithic portions of the housing 12, formed during the extrusion of the housing. With this arrangement the slide rails will extend in the longitudinal direction of the housing. Alternatively, the slide rails 50 could be formed as separate elements mounted to the housing 12, such as by welding. With this arrangement the slide rails need not extend in the longitudinal direction.

The slide rails 50 take the general form of cantilevered elements extending outward from the plane of the associated wall, in this case the first side wall 24. The slide rails 50 are mounted to the housing 12 in spaced opposed relation, with the space between the slide rails 50 providing a close sliding fit for the slide block 36. In particular, the edge walls 42 will abut against the slide rails 50, as best shown in FIG. 3.

As may be seen, in their general form the slide rails 50 will thus prevent movement along the plane of the associated wall except in the longitudinal direction. The slide rails 50 may also be formed to prevent movement of the slide block 36 out of the plane of the wall. This may be achieved by the slide rails 50 forming a shoulder facing toward the associated wall, with this shoulder overlying a portion of the slide block 36. This my be achieved in many ways. For example, the slide rails 50 could each include one or more tongues (not shown) extending toward the other of the slide rails 50, and the edge walls 42 of the slide block 36 could include one or more mating grooves (not shown) which receive these tongues. As an alternative, the slide rails 50 could be angled toward each other, as shown in the figures, and the edge walls 42 of the slide block 36 could include a mating taper. As may be seen, this angle of the slide rails 50 will form a shoulder which will prevent movement of the slide block 36 out of the plane of the associated wall.

While this arrangement will permit the desired movement of the slide block 36, there must be some means provided for actually causing this movement. This means could take various forms. For example, a pneumatic or hydraulic cylinder (not shown) could be attached between the housing 12 and slide block 36. As an alternative, an electric solenoid could be attached in the same manner. While these mechanical and electromechanical arrangements may be effective, there is a concern that they may not provide the desired movement within the short amount of time available. For this reason it is preferred that the slide block 36 be moved by use of pyrotechnics.

In particular, a pyrotechnic initiator 52 (often referred to as a squib) is mounted adjacent the trailing face 40 of slide block 36. As is known in the art, the initiator 52 will communicate with a controller (not shown) via an appropriate electrical connection, and the controller will provide an electrical signal to activate the initiator 52. Upon receipt of this signal, the initiator 52 will create a brief flash of heat, and possibly a quantity of gas. The heat from the inflator will raise the pressure of any surrounding gas (such as air), and this pressure increase will be augmented by any gas produced by the initiator 52. This pressure will act against the trailing face 40 of the slide block 36, creating a force to move the slide block 36 from the first to the second position.

As may be envisioned, it is typically necessary to contain this pressure within a volume to provide the necessary force against the trailing face 40 of the slide block 36. In other words, if the initiator 52 were simply mounted adjacent the trailing face 40 without being contained, the high pressure gas produced by the initiator 52 would simply flow to the surrounding atmosphere without creating the desired force against the slide block 36. As such, if the means for moving the slide block 36 is pyrotechnic, this means further includes a confining volume surrounding the operative portion of the initiator 52.

In the embodiment shown, a blocking wall 54 is mounted between the slide rails 50 to block expansion of the gas in the longitudinal direction. The blocking wall 54 preferably has a mating configuration, best shown in FIG. 4, with the slide rails 50 and associated housing wall, to form a generally gas-tight fit. If desired, appropriate seals (not shown) could also be placed between the blocking wall 54 and the slide rails 50, and/or between the blocking wall 54 and associated wall. The blocking wall 54 will be secured in position, such as by welding, to prevent its movement under the force of the pressure. The blocking wall 54 is mounted such that the initiator 52 is intermediate the blocking wall 54 and trailing face 40 of the slide block 36. To ensure the proper spacing between the blocking wall 54 and trailing face 40 to allow the mounting of the initiator 52, one or more spacers 56 may be placed between the trailing face 40 and the blocking wall 54. In the embodiment shown, two spacers 56 are provided as integral (i.e., monolithic) extensions of the blocking wall 54. These spacers 56 are located at the lateral edges of the blocking wall 54, such that a pressure volume 58 is defined between the spacers 56, trailing face 40 and blocking wall 54 (FIG. 2).

While this arrangement will prevent expansion of the pressure in the longitudinal direction, it will not prevent expansion of the pressure out of the plane of the associated wall. In other words, even with these elements the pressure volume 58 is open to atmosphere in a direction away from the first side wall 24. To fully close the pressure volume 58 the blocking wall 54 could include a further element (not shown) extending between the outer faces of the spacers 56. While this arrangement is serviceable, it may be envisioned that once the slide block 36 begins movement, the trailing face 40 will move away from the blocking wall 54, and therefore from this further element. This would open the pressure volume 58 to atmosphere just after movement of the slide block 36 begins. If the initiator 52 is sufficiently powerful, and/or if the slide block 36 slides easily enough, this may be sufficient to complete the movement of the slide block 36 to the second position. However, to ensure the complete movement of the slide block 36, and permit the use of a less powerful initiator 52, it is preferred that the pressure continue to act on the slide block 36 throughout its movement, or at least for a greater portion of its movement.

To effect this, the means to permit selective pressure relief from the housing may further include a cap 60. The cap 60 will be mounted to the housing 12 in spaced opposed relation to the associated wall of the housing, and will extend (in this embodiment, longitudinally) from the blocking wall 54 at least to the trailing face 40 of slide block 36. This limited longitudinal extent would provide similar performance to the element integral with the blocking wall 54, described above. To permit the use of the less powerful initiator 52, the cap 60 would simply have a greater extent in the direction of movement of the slide block 36 (in this case the longitudinal direction). For example, the cap 60 could extend from the blocking wall 54, over the slide block 36, to a position in proximity to the location of the trailing face 40 of the slide block 36 when the slide block 36 is in the second position.

In addition to this extent, the cap 60 is also positioned such that it is in a close fit to the outer face 46 of the slide block 36, to provide a generally gas-tight fit. As before, an actual seal (not shown) could also be employed. It may therefore be seen that the pressure generated by the initiator 52 will be retained by the blocking wall 54, slide rails 50 and cap 60 to act upon the trailing face 40 of the slide block 36 throughout its travel from the first to the second position. The extent of the cap 60 may be extended even further to provide additional advantages. For example, in the embodiment shown, the cap 60 extends over the housing vent 34, helping to protect the housing vent from ingress of objects, or preventing damage to any protective foil or film (not shown) initially sealing the housing vent 34.

The cap 60 could be formed monolithically with the slide rails 50, as an extrusion with the housing 12. However, if the cap 60 extends over the housing vent 34, as shown, the presence of the cap 60 may make it difficult to punch out the housing vent 34. Alternatively, the cap 60 could be a monolithic extension of the blocking wall 54, in a manner similar to that noted above. However, if the cap 60 has a large extent, it may be necessary to secure the end of the cap 60 which is distant from the blocking wall 54 to prevent deflection of the cap 60. As a further alternative, in the embodiment shown the cap 60 is a separate element mounted to the slide rails 50. This mounting could be achieved by welding the cap to the slide rails 50, but other arrangements may also be used.

Specifically, in the embodiment shown the free ends of the slide rails 50 and the lateral edges of the cap 60 are provided with a mating arrangement which prevents relative movement out of the plane of the associated wall. This mating arrangement may take numerous forms. For example, the slide rails 50 could each include a groove (not shown) which receives a lateral edge of the cap 60. Alternatively, and as shown, the free ends of the slide rails 50 may include an outwardly extending lateral ridge 62, and the lateral edges of cap 60 may include a mating groove 64 which receives an associated one of the ridges 62. Either of these arrangements will prevent movement of the cap 60 away from the plane of the associated housing wall. These arrangements will permit the cap 60 to be formed by extrusion, and to be placed in position by a simple sliding movement.

While the cap 60 may be easily slid into position with these mating arrangements, further steps are required to fully mount the cap 60 to prevent further sliding with respect to the slide rails 50. This may be achieved by small welds at the longitudinal ends of the cap 60. As may be seen, this would reduce the amount of welding required, compared to a cap 60 without the mating arrangement. However, it is also possible to eliminate even the end welds. Specifically, once the cap 60 is place in position, the slide rails 50 (or possibly the cap 60) may subjected to localized plastic (i.e., permanent) deformation so as to disturb the mating relation, and prevent further sliding. In the embodiment shown, this deformation is achieved by either a punching or clamping action in the area of the ridge 62 on the slide rails 50, forming deformations 66 (FIG. 2). A portion of the deformations 66 will extend laterally outward from the ridge 62, blocking the movement of the cap 60 along the slide rails 50. At least one deformation 66 adjacent each of the longitudinal ends of the cap 60 will thus secure the cap 60 in position on the slide rails 50.

This same arrangement may also be used to secure the blocking wall in position and eliminate welding there also. Specifically, one or both of the laterally inner edges of the slide rails 50 may include deformations 68 (FIG. 2) adjacent the outer face (with respect to pressure volume 58) of the blocking wall 54. These deformations will be similar to deformations 66, and will act in the same way to prevent sliding of the blocking wall 54 in a direction toward the right in FIG. 2. As such, these deformations 68 will act against the pressure created during activation of initiator 52, and will maintain the blocking wall 54 in position during such activation.

It is also noted that the blocking wall 54 may move to the left in FIG. 2 during assembly, installation, or during the period of time before activation. If the cap 60 is formed as an extension of the blocking wall 54, and this cap 60 is secured against such movement, the blocking wall 54 will also be secured. However, if the blocking wall 54 is formed as a simple wall without such an extension, a further set of deformations (not shown) may be formed adjacent the inner face of the blocking wall 54 to prevent this movement.

To this point the attachment of the cap 60 to the slide rails 50 (if the cap 60 is formed as a separate element) has ben discussed, as well as the attachment of the blocking wall 54. While the sliding mount of the slide block 36 has also been discussed, it is noted that the slide block 36 should be initially held in the first position, to prevent unintended sliding of the slide block 36. Such unintended sliding will not only create unwanted noise, but may permit the slide block 36 to move to the second position when this is not desired. As such, it is necessary to provide an arrangement to initially maintain the slide block 36 in the first position, yet allow movement when desired.

This can be achieved in various ways. For example, any seals between the slide block 36 and surrounding elements (the associated wall, the slide rails 50 and cap 60) may act to maintain the slide block 36 in position under the small forces experienced prior to activation of initiator 52. Alternatively, one or more beads or drops of a suitable material such a silicone, rubber or plastic (not shown) could be placed on one or more of the surrounding elements adjacent the leading face 38 of the slide block 36. Such beads would prevent movement to the left in FIG. 2 under the small installation forces, but would be sheared away by the leading face 38 upon activation of the initiator 52. Yet another option is to form reversible deformations 70 in one of the surrounding elements (preferably the slide rails 50) adjacent the leading face 38. These reversible deformations 70 would be similar to the deformations 66 and deformations 68, but would be smaller. Specifically, the reversible deformations 70 would be sufficiently small that they would prevent movement prior to activation of the initiator 52, but upon such activation the increased forces would cause the leading face 38 to again deform the reversible deformations 70 sufficiently to permit the slide block 36 to move to the second position, or to shear them away, again permitting the desired movement.

This initial blocking of the movement of slide block 36 can also be used to block the movement of blocking wall 54 to the left in FIG. 2. Specifically, in the embodiment shown the blocking wall 54 includes the spacers 56. The free ends of the spacers 56 abut against the trailing face 40 of the slide block 36. Since the slide block 36 is initially blocked against movement to the left in FIG. 2, the spacers 56, and thus blocking wall 54 will also be blocked against this movement. This same effect can also be used to prevent undesired movement of the slide block 36 to the right in FIG. 2. Specifically, the blocking wall 54 is blocked against this movement by welding, deformations 68 or other arrangement, and as such the spacers 56 will serve to block this movement by the slide block 36. As such, the spacers 56 may serve an additional purpose besides maintaining the pressure volume 58 initially open.

While arrangements have been discussed for maintaining the slide block 36 in the first position prior to activation of the initiator 52, it is noted that there may be a need to provide an arrangement for halting the slide block 36 in the second position. Specifically, the slide block 36 will move from the first position toward the second position with considerable speed to be effective within the short amount of time available during a collision. The slide block 36 must, however, be stopped at the second position to be effective for closing the housing vent 34.

To effect this a block obstacle 72 may be positioned in the path of the slide block 36. As such, the leading face 38 of the slide block 36 will abut against the block obstacle 72 upon reaching the second position, and the slide block 36 will be positioned in the proper location to prevent the flow of inflation gas from the housing vent 34. The block obstacle 72 may take various forms, such as a discontinuity in the guide means 48, a spot weld on one of the surrounding elements, etc. The block obstacle 72 may also be formed as a deformation in the slide rails 50, similar to deformations 66 and deformations 68. By appropriate sizing of the cap 60 and slide block 36, the deformations forming the block obstacle 72 may be formed at the same time as deformations 66, or may even be combined as the same deformation.

The above description substantially completes the first embodiment. However, while the initiator 52 has been described, no detailed mention has been made of its mounting. In this regard, the initiator 52 may be received within an appropriate holder 74, such as by crimping. The holder 74 may then be received through an appropriate hole in one of the surrounding elements such that one end of the initiator 52 is outside of the housing 12 and accessible for electrical connection to the controller (not shown), and the other, pyrotechnic, end is received in the pressure volume 58. In the embodiment shown, the holder 74 extends through the cap 60.

With the structure fully described, the assembly of the illustrated embodiment will be discussed. First, the housing vent 34 is formed in the first side wall 24 by punching. The slide rails 50 are then provided with the reversible deformations 70, and the slide block 36 is inserted between the slide rails 50 to the first position, with the leading face 38 abutting against the reversible deformations 70. The cap 60, with the initiator 52 attached, is then slid onto the slide rails 50. The blocking wall 54 is then inserted between the slide rails 50 until the free ends of the spacers 56 abut against the trailing face 40 of the slide block 36. The deformations 66 and deformations 68 are then formed to secure the cap 60 and blocking wall 54, completing assembly.

In operation, the controller (not shown) will determine if the collision is of the type requiring either a fast or a slow inflation. If slow inflation is called for, the initiator 52 will not be activated, and the inflator 18 will produce gas in a normal manner. A portion of this gas will, however, flow from the housing vent 34 (rupturing any covering foil or film), and will not enter the cushion 20. This will at least reduce the rate of inflation of the cushion 20, and may also reduce the final pressure of the inflated cushion. If, however, the collision is of the type calling for fast inflation, the controller (not shown) will activate the initiator 52. The increased pressure within the pressure volume 58 will force the slide block 36 to move toward the housing vent 34, overcoming the reversible deformations 70. Upon encountering the block obstacle 72, the slide block 36 will stop in the second position and in covering relation to the housing vent 34. The inflator 18, when activated, will again produce inflation gas. In this case, however, all of the gas will flow into the cushion 20, providing at least a more rapid inflation, and possibly increasing the final pressure within the cushion 20.

The operation described above provides two distinct levels of operation. It is noted, however, that other, intermediate levels may also be provided. Specifically, the above description assumed that the controller would either not activate the initiator 52, or would activate the initiator 52 prior to (or simultaneously with) activation of the inflator 18. Intermediate levels of performance may be achieved, however, by activating the initiator 52 after activation of the inflator 18, but before complete inflation of the cushion 20. As may be envisioned, such operation would provide intermediate rates of inflation, and possibly intermediate values for the fmal pressure of the cushion 20. Beyond this, the embodiment shown provides only one housing vent 34 and associated slide block 36. It is possible, however, to provide multiple sets of these elements, which may be activated simultaneously, or with time delays.

Additionally, the above description relates to a housing vent 34 which is initially open, but selectively closed. This arrangement may be reversed, such that the housing vent 34 is initially closed by the slide block 36, but selectively opened by movement of the slide block 36. All that is required for this modification is a change in the location of the housing vent 34 to a position under the slide block 36 when the slide block 36 is in its first position.

As may be seen, this arrangement permits adaptive performance in an airbag inflator by selective pressure relief from the housing.

Figure 5:
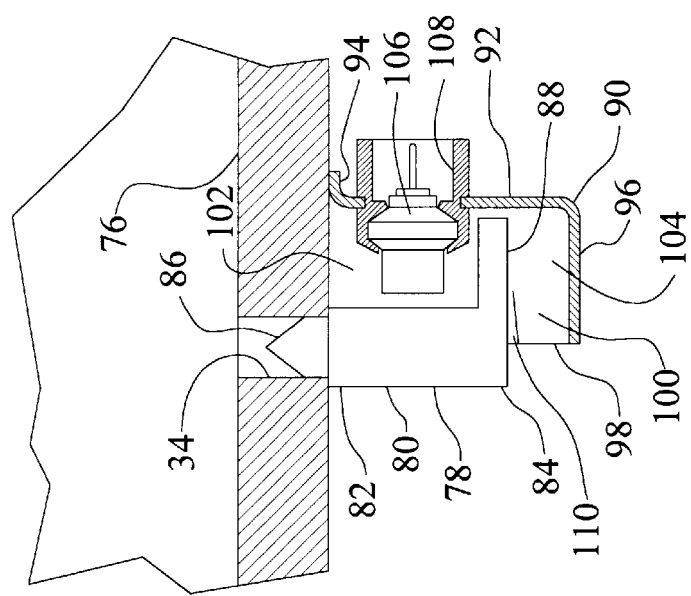
FIG. 5 is a detail side view in partial cross-section showing a venting arrangement according to a second embodiment of the present invention.
Figure 7:
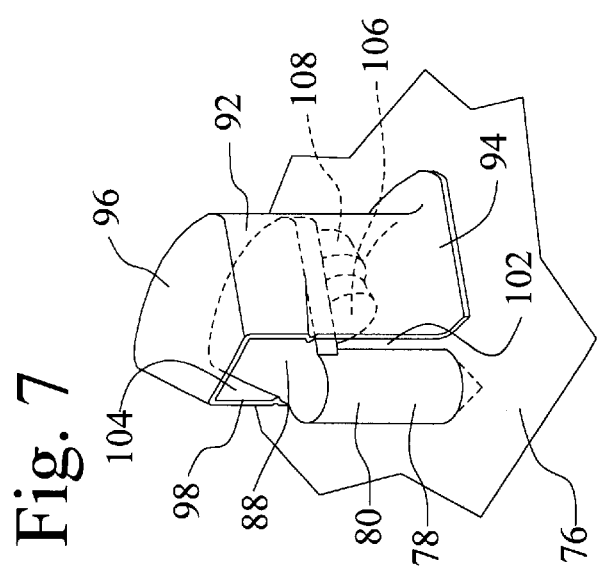
FIG. 7 is an isometric view of the arrangement of FIG. 5.

With reference to FIGS. 5–7, a second embodiment of the present invention is shown.

Specifically, a wall element 76 is shown, which may correspond to any one of the housing walls 24, 26 or 28, as previously described. Extending through the wall element 76 is the housing vent 34. Mounted to the exterior of the wall element 76 (and thus to any one of the first side wall 24, second side wall 26, or bottom wall 28) is a slide member in the form of a slide plug 78, which includes a main body 80 extending generally outward from the wall element 76 and having an inner end 82 adjacent the wall element 76, and an outer end 84. The inner end 82 includes a plug head 86 which may be received within the housing vent 34. The plug head 86 is preferably tapered to a point, for reasons described more fully below. The slide plug 78 also includes a guide flange 88 extending outward from the main body 80. The guide flange will typically extend from only a limited portion of the periphery of the main body 80.

The guide flange 88 is received within a slide cup 90. The slide cup 90 is formed of a rugged material, typically metal. The slide cup 90 includes a partial side wall 92 extending radially outward from the wall element 76 and having first and second ends. The first end is closest to the wall element 76, and includes a mounting flange 94 extending therefrom. This mounting flange 94 may be secured to the wall element 76, such as by welding, to thus secure the slide cup 90. The slide cup 90 also includes a top wall 96 closing the second end of the partial side wall 92.

The partial side wall 92 has cross-sectional configuration which conforms to that of the guide flange 88, as best illustrated in FIG. 6, to form a close sliding fit (the distance between these elements being exaggerated in the figures for clarity). As is best shown in FIG. 6, the guide flange 88 will preferably taper outward along its radial length, or include a shape which forms a shoulder directed radially toward the main body 80. While the partial side wall 92 conforms to the guide flange 88, it does not completely enclose the slide plug 78. As may be seen, the cross-sectional configuration of the partial side wall 92 is an open, rather than closed, polygon. As such, the partial side wall 92 defines a mouth 98 providing access to a cup interior 100 formed within the confines of the partial side wall 92 and top wall 96. This mouth will preferably be in close proximity to the main body 80, as shown, and the guide flange 88 will extend through the mouth 98 to be received within the cup interior 100.

It is further noted that the length of the partial side wall 92 is greater than that of the main body 80. As such, the guide flange 88 serves to divide the cup interior 100 into a lower portion 102 between the wall element 76 and guide flange 88, and an upper portion 104 between the guide flange 88 and top wall 96. The upper portion 104 provides an area through which the guide flange 88 may travel outward away from the wall element 76. Since the guide flange 88 is secured to the main body 80, this travel will also result in the main body 80 moving away from the wall element 76. This travel is designed to be sufficient open the housing vent 34 for flow of the inflation gas from the housing vent 34.

While this description shows how the slide plug 78 can move, there must of course be some element which actually causes the movement. Such an element could take various forms, such as mechanical (e.g., a pneumatic cylinder connected to the guide flange 88 and wall element 76 or top wall 96), electromechanical (e.g., a solenoid connected to the guide flange 88 and wall element 76 or top wall 96), or pyrotechnic. The preferred element is pyrotechnic.

Specifically, the partial side wall 92 may mount a slide plug initiator 106, having a form similar to the initiator described above. The slide plug initiator 106 may be received within an appropriate holder 108, and the holder received through the partial side wall 92, such that one end of the slide plug initiator 106 is outside of the cup interior 100 and accessible for electrical connection to the controller (not shown), and the other, pyrotechnic, end is received in the lower portion 102 of the cup interior 100. As may be envisioned, activation of the slide plug initiator 106 will cause an increase in pressure within the lower portion 102 of the cup interior 100, forcing the guide flange 88, and thus the main body 80, away from the wall element 76 to open the housing vent 34. The mouth 98 must be in sufficient proximity to the main body 80 to permit the necessary pressure increase within the cup interior 100. The close sliding fit of the guide flange 88 within the partial side wall 92 assists in pressure generation, and further guides the main body 80 during its travel. Further, the shape of the guide flange 88 (forming the shoulder directed toward the main body 80) causes the guide flange 88 to be retained within the partial side wall 92 even after the housing vent 34 has been opened, to ensure that the slide plug 78 remains associated with the module, and does not fly away and cause a danger to the vehicle occupant.

The amount of travel required to open the housing vent 34 may be reduced by forming the plug head 86 with a taper or conical configuration, as shown. As may be envisioned, with such a shape the inflation gas may flow through the housing vent 34 even though the radially inner end of the plug head 86 has not moved outside of the wall element 76. This allows the required amount of travel for the slide plug 78 to be reduced, thus reducing the size of the partial side wall 92.

As may be seen, the housing vent 34 may thus be selectively opened, if desired, to alter the performance of the module in a manner similar to that described for the first embodiment. In this regard, it is noted that the most aggressive performance will be achieved by not opening the housing vent 34, the least aggressive performance will be achieved by opening the housing vent 34 prior to (or simultaneously with) activation of the inflator 18, and intermediate levels may be achieved by opening the housing vent 34 after activating the inflator 18 but before full inflation of the cushion 20. Beyond this, it is also possible to provide multiple housing vents, each with an associated slide plug, and to open these vents at different times to further vary performance.

In each of these situations the inflation gas within the interior 14 will increase in pressure. This pressure will act against the plug head 86, and will tend to force the slide plug 78 to move outward. To prevent unintentional movement of the slide plug 78, the partial side wall 92 may include one or more deformation locks 110. The deformation locks 110 are portions of the partial side wall 92 which have been plastically deformed inward at a position just above the guide flange 88, to thus block unintended movement of the slide plug 78 away from wall element 76. The deformation locks 110 are designed, however, to deform outward upon activation of the element for moving the slide plug 78, permitting the slide plug 78 to move when actually desired.

It is also noted that the slide plug 78 and related structure could also be modified for operation similar to the first embodiments, i.e., to block an initially open port. For this arrangement the slide plug 78 would be held in an initially open position, such as by use of deformation locks 110 positioned between the guide flange 88 and wall element 76. The slide plug initiator 106 would be located in the upper portion 104, rather than the lower portion 102, to force the slide plug 78 inward upon activation. Depending upon the fit achieved between the plug head 86 and housing vent 34, the deformation locks 110 (or another one of the deformation locks 110) could engage with the upper face of the guide flange 88 after inward travel to retain the slide plug 78 in its new position.

As may be seen, this second embodiment will also permit the selective pressure reduction by venting of the inflation gas from the housing. This second embodiment will therefore also permit adaptive performance.

With reference to FIGS. 8–10, a third embodiment of the present invention is shown. The basic design of the module is similar to those in the first two embodiments, and for similar elements the same reference numerals are employed. The main difference in this embodiment is that there is not an existing housing vent which is opened or closed, but rather a housing vent is selectively formed.

Specifically, a portion of the housing 12 is selectively deformed from its initial position so as to create a passage or housing vent from which the inflation gas may exit. The particular portion of the housing which is deformed may of course vary. The first side wall 24, second side wall 26 or bottom wall 28 could be deformed to create the housing vent if desired. This deformation would preferably take place at one or both of the longitudinal ends 30. In the embodiment shown, however, it is one or both of the end walls 32 which are deformed. This arrangement permits the housing 12 to be the strongest, to thus resist unintentional deformation.

Specifically, one or both of the end walls 32 will include a deformation tab 112 extending laterally outward from the adjacent one of the walls 24, 26 or 28. In the embodiment shown, each of the end walls 32 includes a deformation tab 112, and the deformation tabs 112 are both located to extend laterally outward from the first side wall 24. Depending upon the thickness and strength of the end wall 32, there may be provided one or more areas of reduced strength adjacent to or within the deformation tab 112. In the embodiment shown, these areas of reduced strength are formed by tab grooves 114. These grooves are located to permit the deformation tab 112 to more easily deform from a first, closed, position shown in solid line in FIGS. 9 and 10, to a second, open, position shown in dashed line in FIGS. 9 and 10. In this second position a housing vent 116 is formed between the deformation tab 112 and the adjacent portions of the housing 12.

As may be seen, in the first position, the deformation tab 112 will maintain the housing 12 in its initial substantially sealed configuration. The entirety of the inflation gas produced by the inflator 18 will thus flow into the cushion 20 to inflate the cushion 20 in the most rapid manner, and possibly to its greatest pressure. In the second position, however, a portion of the inflation gas will flow out of the housing vent 116. As such, the cushion 20 will be inflated at a less rapid rate, and may possibly have a lower final pressure.

To provide this operation, there must of course be provided some arrangement to cause the selective deformation of the deformation tab 112. In this regard it is noted that the inflation gas produced by the inflator 18 will greatly increase the pressure within the housing 12 upon activation. This pressure within the housing will not, by itself, be sufficient to cause the deformation. Rather, a force must be applied to the deformation tab 112 extending outward from the housing 12. While the deformation tab 112 may be designed such that the combination of the internal housing pressure and the external force are both required for deformation, it is preferred that the external force alone can cause the desired deformation.

Various arrangements may be employed to cause the deformation of the deformation tab 112, and are generally referred to as means for directing a deforming force against the deformation tab. For example, a pneumatic or hydraulic cylinder (not shown) could be connected between the adjacent wall of the housing and the deformation tab 112, such that extension of the cylinder would cause the deformation. Alternatively, an electric solenoid (not shown) could be arranged in a similar manner. As in the first two embodiments, however, these mechanical and electromechanical arrangements may not be sufficiently fast to provide the deformation within the short amount of time available in a collision. A sufficiently fast alternative is, again, pyrotechnic.

To provide this pyrotechnic force, there is first provided a pressure housing 118 mounted to the adjacent wall (in this case the first side wall 24). The pressure housing 118 may be a generally concave member formed of rugged material, such as stamped metal. The pressure housing 118 may be mounted to the housing by any sufficiently strong arrangement, such as a mounting flange 120 welded to the associated wall. The generally concave form of the pressure housing 118 opens onto the adjacent wall, and together these elements define a pressure volume 122 (FIG. 10). The pressure housing 118 also includes a mouth 124 (best shown in FIG. 8) which communicates with the pressure volume 122, and abuts against the deformation tab 112.

A tab initiator 126, having a form similar to the initiators described above, is then operatively associated with the pressure volume 122. The tab initiator 126 could be mounted to the deformation tab 112 and extend through the mouth 124, but it is preferred that the tab initiator 126 be mounted to the pressure housing 118. Specifically, the tab initiator 126 could be mounted in a holder 128, such as by crimping. The holder 128 could then be secured to the pressure housing 118, such that one end of the tab initiator 126 is outside of the pressure housing 118 and accessible for electrical connection to the controller (not shown), and the other, pyrotechnic, end is received in the pressure volume 122, as best shown in FIG. 10.

As may be envisioned, activation of the tab initiator 126 will rapidly heat the gas (typically air) trapped within the pressure volume 122, increasing its pressure. As in the previous embodiments, any gas produced by the tab initiator 126 will serve to further increase pressure in the pressure volume 122. This increased pressure within the pressure volume 122 acts through the mouth 124 upon the deformation tab 112, creating a force against the deformation tab 112. This force, whether alone or in combination with the pressure within the interior 14, will plastically (i.e., permanently) deform the deformation tab 112 from its first to its second position. As noted, this deformation will form the housing vent 116, through which the inflation gas may flow.

The method of operation of this embodiment to provide adaptive performance is similar to the first two embodiments. Briefly, the controller will not activate the tab initiator 126, maintaining integrity of the housing 12 if rapid inflation, or higher cushion pressure, is desired. If slower inflation, or a reduced cushion pressure are called for, the controller will activate the tab initiator 126, deforming the deformation tab 112 and venting a portion of the inflation gas from the housing 12. Also as before, the controller may activate the tab initiator 126 prior to (or simultaneously with) activation of the inflator 18, or may activate the tab initiator 126 after activation of the inflator 18 for further variation in performance. Also, as illustrated in FIG. 8, more than one deformation tab 112 may be provided, such that multiple housing vents 116 may be formed, either simultaneously, or with a time delay, to provide even further variation in performance. It is noted that while both deformation tabs 112 are shown adjacent first side wall 24, the additional deformation tab(s) 112 could, alternatively or additionally, be provided adjacent one of the other walls 26 and/or 28.

As this description makes clear, this embodiment will also permit selective venting of the housing to reduce pressure and thus provide adaptive performance.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A method of providing adaptive performance in an airbag module having a housing defining an interior, an inflator mounted within said interior, and a cushion operatively connected to said housing, comprising the steps of:

activating said inflator to produce a quantity of inflation gas; and selectively taking an action from the group consisting of 1) opening a housing vent in said housing to permit a portion of said inflation gas to vent from said housing vent, and 2) closing a housing vent in said housing to prevent said inflation gas from venting from said housing vent, said action further including providing a slide block mounted to said housing for movement between first and second positions, in said first position said slide block being either in covering relation to said housing vent or in spaced relation to said housing vent, and in said second position said slide block being in the other of said covering relation to said housing vent or said spaced relation to said housing vent, and selectively moving said slide block from said first to said second position.

2. A method as in claim 1, wherein said step of selectively moving said slide block further includes providing an initiator adjacent to said side block in operative relation such that activation of said initiator causes slide block to move from said first to said second position, and selectively activating said initiator.

3. A method of providing adaptive performance in an airbag module having a housing defining an interior, an inflator mounted within said interior, and a cushion operatively connected to said housing, comprising the steps of:

activating said inflator to produce a quantity of inflation gas; and selectively taking an action from the group consisting of 1) opening a housing vent in said housing to permit a portion of said inflation gas to vent from said housing vent, and 2) closing a housing vent in said housing to prevent said inflation gas from venting from said housing vent, said action further including providing a slide plug mounted to said housing from movement between first and second positions, in said first position said slide plug being either in covering relation to said housing vent or in spaced relation to said housing vent, and in said second position said slide plug being in the other of said covering relation to said housing vent or said spaced relation to said housing vent, and selectively moving said slide plug from said first to said second position.

4. A method as in claim 3, wherein said step of selectively moving said slide plug further includes providing an initiator adjacent to said side plug in operative relation such that activation of said initiator causes said slide plug to move from said first to said second position, and selectively activating said initiator.

5. A method of providing adaptive performance in an airbag module having a housing defining an interior, an inflator mounted within said interior, and a cushion operatively connected to said housing, comprising the steps of:

activating said inflator to produce a quantity of inflation gas; and selectively taking an action from the group consisting of 1) opening a housing vent in said housing to permit a portion of said inflation gas to vent from said housing vent, and 2) closing a housing vent in said housing to prevent said inflation gas from venting from said housing vent, said action further including selectively plastically deforming a portion of said housing to form and open said housing vent and wherein said housing includes a deformation tab extending therefrom, and said action further includes providing means for directing a deforming force against said deformation tab, and selectively activating said means for directing a deforming force and said housing including first and second spaced, opposed side walls interconnected at an inner end by a bottom wall, each of said walls having longitudinal ends, and an end wall secured to each of said longitudinal ends, and said deformation tab is an extension of one of said end walls, and extends laterally outward from an adjacent one of said walls.

6. A method as in claim 5, wherein said means for directing a deforming force includes a pressure housing mounted to said adjacent one of said walls in proximity to said deformation tab, said pressure housing having a mouth opening onto said deformation tab, said pressure housing mounting an initiator such that activation of said initiator will increase pressure within said pressure housing and create a deforming force against said deformation tab, and wherein selectively activating said means for directing a deforming force comprises selectively activating said initiator.

7. In an airbag module having a housing with spaced opposed side walls and a bottom wall extending therebetween, said walls having longitudinal ends to which end walls are mounted, said walls defining an interior in which an inflator is mounted to produce inflation gas, the improvement comprising:

a housing vent extending through said housing, through which a portion of said inflation gas may vent;

a slide member mounted to said housing for movement between first and second positions, in said first position said slide member being either in covering relation to said housing vent or in spaced relation to said housing vent, and in said second position said slide member being in the other of said covering relation to said housing vent or said spaced relation to said housing vent, and;

an initiator mounted to said housing in a position such that selective activation of said initiator will cause said slide member to move from said first to said second position.

8. The improvement of claim 7, wherein said housing further includes a pair of slide rails extending in spaced opposed relation along one of said walls, and said slide member is a slide block mounted for movement between said slide rails.

9. The improvement of claim 8, wherein said side walls, bottom wall, and slide rails are extruded as a monolithic unit.

10. The improvement of claim 7, wherein a slide cup extends outward from one of said walls, and said slide member is a slide plug having a plug head which may be received in said housing vent when said slide plug is in covering relation to said housing vent, and having a guide flange received in said slide cup for guiding said slide plug during said movement from said first to said second position.

11. In an airbag module having a housing with spaced opposed side walls and a bottom wall extending therebetween, said walls having longitudinal ends to which end walls are mounted, said walls defining an interior in which an inflator is mounted to produce inflation gas, the improvement comprising:

an initiator mounted to said housing in a position such that selective activation of said initiator will cause a portion of said housing to plastically deform and form a housing vent through which a portion of said inflation gas may vent and said portion of said housing comprising a deformation tab extending from an edge of one of said walls.

12. The improvement of claim 11, further including a pressure housing mounted to an another of said walls adjacent to said deformation tab, said pressure housing including a mouth opening onto said deformation tab, and said initiator being operatively associated with said pressure housing such that said selective activation of said initiator will cause a pressure increase within said pressure housing which acts upon said deformation tab through said mouth.

* * * * *